(12) United States Patent
Keating et al.

(10) Patent No.: US 11,889,425 B2
(45) Date of Patent: Jan. 30, 2024

(54) METHODS AND APPARATUSES FOR MITIGATING REDUCED COMPLEXITY FEATURES IMPACT ON POSITIONING PERFORMANCE

(71) Applicant: NOKIA TECHNOLOGIES OY, Espoo (FI)

(72) Inventors: Ryan Keating, Chicago, IL (US); Xiaomao Mao, Paris (FR); Nitin Mangalvedhe, Hoffman Estates, IL (US); Rapeepat Ratasuk, Inverness, IL (US); Muhammad Majid Butt, Palaiseau (FR); Man Hung Ng, Wiltshire (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/471,860

(22) Filed: Sep. 10, 2021

(65) Prior Publication Data

US 2023/0079232 A1    Mar. 16, 2023

(51) Int. Cl.
*H04W 52/02* (2009.01)
*H04W 8/22* (2009.01)
(Continued)

(52) U.S. Cl.
CPC ....... *H04W 52/0261* (2013.01); *H04L 5/0051* (2013.01); *H04W 8/22* (2013.01); *H04W 64/003* (2013.01)

(58) Field of Classification Search
CPC . H04W 52/0261; H04W 8/22; H04W 64/003; H04W 8/245; H04W 28/0221;
(Continued)

(56) References Cited

U.S. PATENT DOCUMENTS

2011/0244879 A1    10/2011  Slomina et al.
2019/0297849 A1    9/2019   Lei et al.
(Continued)

FOREIGN PATENT DOCUMENTS

WO    2021168574 A1    9/2021

OTHER PUBLICATIONS

International Search Report and Written Opinion dated Oct. 11, 2022, corresponding to International Application No. PCT/FI2022/050437.

(Continued)

*Primary Examiner* — Michael Y Mapa
(74) *Attorney, Agent, or Firm* — SQUIRE PATTON BOGGS (US) LLP (57) ABSTRACT

Systems, methods, apparatuses, and computer program products for positioning support are provided. One method may include receiving, by a UE configured with power saving feature(s), positioning performance requirements for a positioning session. The method may also include estimating an impact of one or more power saving or reduced capability features on positioning measurements associated with the positioning session and, based on the accuracy and latency requirements and the estimated impact, determining the power saving or reduced capability features that the UE can implement while still achieving the accuracy and latency requirements for the positioning session. The method may then include signaling, to a network node, information on the determined power saving or reduced capability features that the UE can implement while still achieving the required accuracy and latency requirements for the positioning session.

13 Claims, 5 Drawing Sheets

(51) Int. Cl.
*H04L 5/00* (2006.01)
*H04W 64/00* (2009.01)

(58) Field of Classification Search
CPC ......... H04W 28/0226; H04W 28/0236; H04W 64/00; H04L 5/0051
USPC ........ 370/329; 455/404.2, 414.2, 456.1–457, 455/574
See application file for complete search history.

(56) References Cited

U.S. PATENT DOCUMENTS

| | | | |
|---|---|---|---|
| 2021/0051622 | A1 | 2/2021 | Manolakos et al. |
| 2021/0099832 | A1 | 4/2021 | Duan et al. |
| 2021/0410098 | A1* | 12/2021 | Bao .................... H04W 52/028 |
| 2022/0082649 | A1* | 3/2022 | Duan ................ H04W 52/0216 |
| 2022/0322273 | A1* | 10/2022 | Agnihotri ............. H04W 48/16 |
| 2023/0063450 | A1* | 3/2023 | Fakoorian ............. H04L 5/0051 |

OTHER PUBLICATIONS

Xiaomi, Evolution of RedCap in Release 18, 3GPP Draft, RWS-210267, 3GPP TSG RAN Rel-18 workshop, Electronic Meeting Jun. 28-Jul. 2, 2021, Agenda Ite,: 4.2., Jun. 7, 2021.
Ericsson, "Revised WID on support of reduced capability NR devices", 3GPP TSG RAN Meeting #92e, RP-211574, Jun. 14, 2021.
Qualcomm Incorporated, "New SID on NR Positioning Enhancements", 3GPP TSN RAN Meeting #86, RP-193237, Dec. 9, 2019.
Intel Corporation, Ericsson, "New WID: NR Positioning Support", 3GPP TSN RAN Meeting #83, RP-190752, Mar. 18, 2019.

* cited by examiner

METHODS AND APPARATUSES FOR MITIGATING REDUCED COMPLEXITY FEATURES IMPACT ON POSITIONING PERFORMANCE

FIELD

Some example embodiments may generally relate to communications including mobile or wireless telecommunication networks, such as Long Term Evolution (LTE) or fifth generation (5G) radio access technology or new radio (NR) access technology, or other communications systems. For example, certain example embodiments may generally relate to systems and/or methods of positioning support in such networks.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus that may include at least one processor and at least one memory comprising computer program code. The at least one memory and computer program code are configured, with the at least one processor, to cause the apparatus at least to perform: determining or receiving positioning performance requirements for a positioning session, estimating an impact of one or more reduced capability features on positioning performance based on at least measurements associated with the positioning session, and, based on the positioning performance requirements and the estimated impact, determining a subset of the one or more reduced capability features that the apparatus can implement while still achieving the positioning performance requirements for the positioning session.

An embodiment may be directed to a method that may include receiving or determining, by a user equipment, positioning performance requirements for a positioning session, estimating an impact of one or more reduced capability features on positioning performance based at least on measurements associated with the positioning session, and, based on the positioning performance requirements and the estimated impact, determining a subset of the one or more reduced capability features that the user equipment can implement while still achieving the positioning performance requirements for the positioning session.

An embodiment may be directed to an apparatus including means for: determining or receiving positioning performance requirements for a positioning session, estimating an impact of one or more reduced capability features on positioning performance based at least on measurements associated with the positioning session, and, based on the positioning performance requirements and the estimated impact, determining a subset of the one or more reduced capability features that the apparatus can implement while still achieving the positioning performance requirements for the positioning session.

An embodiment may be directed to an apparatus that may include at least one processor and at least one memory comprising computer program code. The at least one memory and computer program code are configured, with the at least one processor, to cause the apparatus at least to perform: receiving, from a user equipment, information on one or more reduced capability features that the user equipment can implement while still achieving positioning performance requirements for a positioning session and, based on the received information, configuring the user equipment with at least one of the reduced capability features to be implemented by the user equipment.

An embodiment may be directed to a method that may include receiving at a network node, from a user equipment, information on one or more reduced capability features that the user equipment can implement while still achieving positioning performance requirements for a positioning session and, based on the received information, configuring the user equipment with at least one of the reduced capability features to be implemented by the user equipment.

An embodiment may be directed to an apparatus including means for: receiving, from a user equipment, information on one or more reduced capability features that the user equipment can implement while still achieving positioning performance requirements for a positioning session and, based on the received information, configuring the user equipment with at least one of the reduced capability features to be implemented by the user equipment.

An embodiment may be directed to an apparatus that may include at least one processor and at least one memory comprising computer program code. The at least one memory and computer program code configured, with the at least one processor, to cause the apparatus at least to perform: receiving positioning performance requirements for a positioning session of a user equipment, estimating an impact of one or more reduced capability features on positioning performance based on measurements associated with the positioning session and, based on the positioning performance requirements and the estimated impact, determining criteria for the one or more reduced capability features to be turned on or off (or activated or deactivated) by the user equipment.

An embodiment may be directed to a method that may include receiving, by a network node, positioning performance requirements for a positioning session of a user equipment, estimating an impact of one or more reduced capability features on positioning performance based on measurements associated with the positioning session and, based on the positioning performance requirements and the estimated impact, determining criteria for the one or more reduced capability features to be turned on or off (or activated or deactivated) by the user equipment.

An embodiment may be directed to an apparatus including means for: receiving positioning performance requirements for a positioning session of a user equipment, estimating an impact of one or more reduced capability features on positioning performance based on measurements associated with the positioning session and, based on the positioning performance requirements and the estimated impact, determining criteria for the one or more reduced capability features to be turned on or off (or activated or deactivated) by the user equipment.

An embodiment may be directed to an apparatus including at least one processor and at least one memory comprising computer program code. The at least one memory and computer program code configured, with the at least one processor, to cause the apparatus at least to perform: receiving, from a network node, criteria for one or more reduced capability features configured to the apparatus, evaluating the criteria based on current channel conditions at the apparatus, and activating or deactivating (or turning on or off) at least one of the reduced capability features based on a result of the evaluation of the criteria.

An embodiment may be directed to a method that may include receiving at a user equipment, from a network node, criteria for one or more reduced capability features configured to the user equipment, evaluating the criteria based on current channel conditions at the user equipment, and activating or deactivating (or turning on or off) at least one of the reduced capability features based on a result of the evaluation of the criteria.

An embodiment may be directed to an apparatus including means for: receiving, from a network node, criteria for one or more reduced capability features configured to the apparatus, evaluating the criteria based on current channel conditions at the apparatus, and activating or deactivating (or turning on or off) at least one of the reduced capability features based on a result of the evaluation of the criteria.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for positioning support, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Several positioning solutions have been specified for NR Release-16. These positioning techniques include Downlink Time Difference of Arrival (DL-TDOA), Uplink Time Difference of Arrival (UL-TDOA), Downlink Angle of Departure (DL-AoD), Uplink Angle of Arrival (UL-AoA), NR Enhanced Cell ID (E-CID), and Multi-cell Round Trip Time (Multi-RTT). These techniques are based on making measurements on the positioning reference signal (PRS) and sounding reference signal for positioning (SRS-P). The PRS may be measured by target UEs, which then report the measurements to the location server (e.g., the location management function—LMF). The location server may then estimate the location of the UE based on the measurements and the known locations of the base stations. In Release-17, there will be further work on NR positioning with a target being the Industrial IoT (IIoT) use cases. It is noted that the location server may also be implemented as part of the RAN and may be referred to as the local location management component (LMC) in some embodiments.

Reduced capability (RedCap) devices are also being designed and standardized in Release-17. There, RedCap NR devices are designed with relatively longer battery life as compared to IoT devices. One such RedCap feature to extend battery life is radio resource management (RRM) measurement relaxations for RedCap devices. RRM measurement relaxations allow RedCap devices to perform RRM measurements less frequently and/or to perform RRM measurements on less cells or transmission points in order to reduce power consumption, for example.

Figure 1:
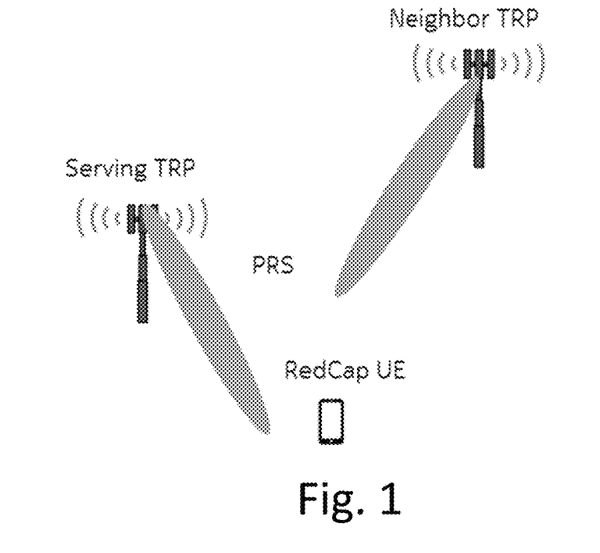
FIG. 1 illustrates an example of a reduced capability (RedCap) UE measuring positioning reference signal (PRS) for positioning from a serving transmit-receive point (TRP) and neighbour TRP, according to an example embodiment.

Thus, enhancements relating to positioning support for RedCap devices are being considered. FIG. 1 illustrates an example of a RedCap UE measuring PRS for positioning from a serving transmit-receive point (TRP) and neighbour TRP. One of the main positioning protocols for downlink DL techniques is the LTE positioning protocol (LPP). LPP can be used to exchange messages between the UE and LMF. A key characteristic of LPP is that it is transparent to the serving TRP. It should be noted that, although some example embodiments are described in reference to PRS, which is a specific reference signal defined by 3GPP standards, certain embodiments can also apply more generally to any reference signals used for positioning purposes. Hence, example embodiments are not limited to just PRS, but may apply to other types of reference signals.

Figure 2:
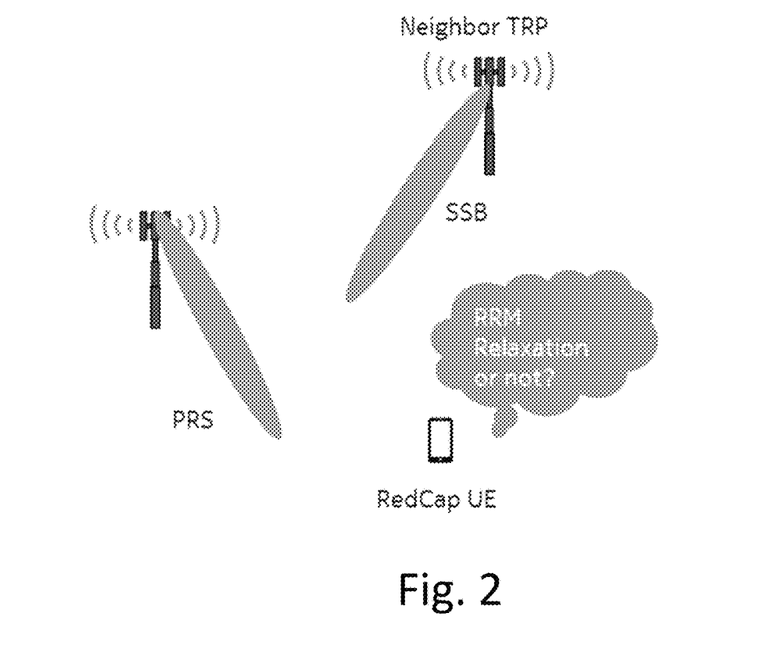
FIG. 2 illustrates an example scenario of RedCap UE conflict between power saving and positioning, according to an example embodiment.

One of the problems addressed by some example embodiments described herein includes the priority conflict that arises when a RedCap UE, which wants to reduce its power consumption as much as possible, also wants to perform accurate NR positioning. Typically, in NR positioning, wideband measurements are performed in order to achieve high accuracy. As one example, in RedCap, RRM measurement relaxation is under network control, but this may impact positioning performance as the LMF is not aware of any potential RRM relaxation. Its impact on positioning performance can be illustrated by a concrete example. One such example is the use of Quasi-colocation (QCL) information for positioning. A UE may be using the synchronization signal block (SSB) to determine the best receive (Rx) beam to use and then, if the PRS is QCL'd with that SSB, the UE uses the same Rx beam for the reception of PRS. If the UE has not measured the SSB (e.g., due to RRM relaxation) for some time, then it will impact the performance of positioning as the Rx beam may not be updated. This can impact both the positioning accuracy as well as the latency (not having the best Rx beam may force UE to perform Rx beam sweeping and delay the measurement). Therefore, such a UE should determine if it can still perform RRM relaxation or not. FIG. 2 illustrates an example of such a scenario of RedCap UE conflict between power saving and positioning.

Similarly, other power saving or reduced complexity features may impact positioning performance but might not be under the control of the LMF. Therefore, an issue arises as to how to handle a UE which has low complexity features that may impact positioning performance.

Certain example embodiments provide a method to enable a UE and/or gNB to determine the optimal or preferred sets of configured power saving and/or reduced capability features and/or parameters, based on the positioning accuracy and latency required for a given RedCap UE. In one embodiment, a UE may make the decision on optimal features. In another embodiment, a network node, such as a gNB, can make the decision.

According to a UE-centric embodiment, a RedCap UE may be configured with a set of features that are configured to enable power saving at the UE. For example, these features may include RRM measurement relaxation, relaxed beam measurements, switching off one receiver branch, operating in half-duplex mode, etc. As part of a positioning configuration, a location server (e.g., LMF) may inform the UE of the required accuracy and latency of the positioning session. The UE may then estimate the impact of various power saving/reduced complexity features on the positioning performance. For instance, the positioning performance may include at least latency and accuracy. As one example, the UE may not have prior measurements to determine Rx beam or other receiving parameters (e.g., timing) on QCL signals to the PRS if using RRM measurement relaxation. The UE can estimate the impact on latency/accuracy due to need for Rx beam sweeping on PRS. The UE may also consider its own positioning capabilities when determining the impact (e.g., PRS processing capability).

In this example embodiment, based on required positioning accuracy/latency and the estimated impact, the UE may then determine the optimal power saving and/or reduced capability features and/or configurations that it can implement while still achieving the positioning requirements. For example, the UE may determine that it needs to cancel or pause the RRM relaxation. Similar logic can apply to other power saving features. This determination by the UE may also be dependent on the current channel conditions, for instance, as determined by, e.g., reference signal received power (RSRP), line-of-sight (LoS) status. The LoS status may refer to a line-of-sight between a UE and gNB, for example. In an embodiment, the current channel conditions may be evaluated for both the serving gNB and neighbor gNBs.

According to an embodiment, the UE may then signal, to the network or gNB, the information on the optimal power saving and/or reduced capability features it can implement, and the gNB can configure or reconfigure the appropriate features. Certain embodiments may provide new signaling to enable the UE to signal the need to pause some features to the gNB or network. Using RRM relaxation as an example, the UE may request that for the next N measurements that it should not go into relaxed mode. In another embodiment, the UE may signal a time window where it should not use the power saving features (i.e., for T ms the UE should pause a given feature), where the starting time may be implicitly derived or explicitly signaled. The gNB may use broadcast signaling (e.g., SIB) or dedicated signaling (e.g., RRC) to indicate or update a configuration. Alternatively, the gNB may use medium access control (MAC) control element (CE) or downlink control information (DCI) based signaling to indicate cancellation or pausing of a power saving/reduced capability feature, causing the UE to use a default configuration (e.g., the indication is that RRM relaxation should not be used). In an embodiment, the UE may perform positioning measurements as part of positioning session.

According to a gNB-centric embodiment, a RedCap UE may be configured with a set of features and/or configurations that can enable power saving at the UE (e.g., RRM measurement relaxation, relaxed beam measurements, etc.). The UE may report, to the gNB or network, its positioning capabilities (e.g., PRS processing capability) that may affect positioning performance. As part of a positioning configuration, an LMF/UE may inform the gNB of the required accuracy and latency of the positioning session. The gNB may then estimate the impact of various power saving/reduced complexity features and/or configurations on the positioning performance (e.g., at least latency and accuracy) for different channel conditions that may be experienced by UEs.

In an embodiment, the gNB may then determine criteria for reduced capability or power saving features to be turned on/off by the UE (e.g., don't perform RRM relaxation) and can configure or reconfigure the appropriate features for the UE. The gNB may use broadcast signaling (e.g., SIB) or dedicated signaling (e.g., RRC) to indicate or update a configuration. Alternatively, the gNB may use MAC CE or DCI based signaling to indicate cancellation, pausing, and/or deactivation of a power saving/reduced capability feature, causing the UE to use a default configuration (e.g., the indication is that RRM relaxation should not be used). Criteria set by the gNB may include or relate to signal-to-noise ratio (SNR), RSRP, reference signal received quality (RSRQ), LoS status, beam sweeping time, etc. These conditions could be threshold values signaled by the gNB. According to one embodiment, the gNB can also take into account the positioning capabilities of the UE (e.g., PRS processing capability, bandwidth, measurement accuracy, etc.). In certain embodiments, the UE may receive the criteria determined by the gNB, and the UE can then evaluate them based on the current channel conditions and turns on/off the appropriate reduced capability features. The UE may perform positioning measurements as part of positioning session.

According to certain example embodiments, the reduced capability features may be features that are supported by RedCap devices or UEs, for instance. In some embodiments, these reduced capability features may include at least power saving features.

It is noted that, in both the UE-centric and gNB-centric embodiments discussed above, when the UE or gNB determines the impact on performance, there can be both offline characterization of impact and also use of recent history of measurement performance to assist in the determination.

Figure 3:
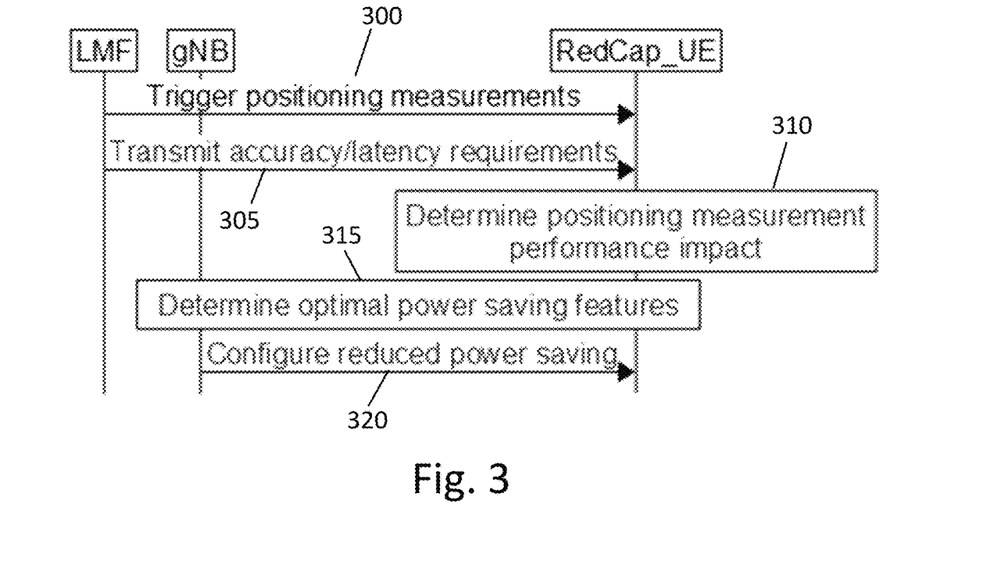
FIG. 3 illustrates a signaling diagram, according to an example embodiment.

FIG. 3 illustrates an example signaling flow diagram according to a UE-centric embodiment. In an embodiment, a RedCap UE may be configured with a set of features that can enable power saving at the UE (e.g., RRM measurement relaxation, relaxed beam measurements, etc.). As illustrated in the example of FIG. 3, at 300, a location server (LMF) may trigger positioning measurements at the RedCap UE. As part of a positioning configuration, at 305, the LMF may inform the RedCap UE of the required accuracy and latency of the positioning session. As an additional embodiment, the LMF may also indicate some required integrity to the UE (i.e., level of trust or confidence in the positioning estimation).

As further illustrated in the example of FIG. 3, at 310, the UE may determine positioning measurement performance impact, e.g., by estimating the impact of various power saving/reduced complexity features on the positioning performance (at least latency and accuracy). For example, the UE may not have prior measurements to determine Rx beam or other receiving parameters (e.g., timing) on QCL signals to the PRS if using RRM measurement relaxation. The UE can estimate the impact on latency/accuracy due to need for Rx beam sweeping on PRS. The UE may also consider its own positioning capabilities (e.g., PRS processing capability) when determining the impact at 310. The UE may also take into account the current channel conditions and/or how quickly these conditions are changing. For example, the UE may be relatively stationary and know that the Rx beam it is using for a particular RS has remained constant over a long time. In that case, the need for recent RS measurements may not be as critical. However, if the UE starts to move then this may again become relevant.

Based on required positioning accuracy/latency and the estimated impact, at 315, the UE may then determine the optimal power saving/reduced capability features the UE can implement or is capable of implementing, while still achieving the positioning requirements. For example, the UE may determine that it needs to cancel or pause the RRM relaxation. Similar logic can apply to other power saving features. The need to pause and/or cancel certain features, such as RRM, may also be relevant even when the UE is only moving within a cell and is not near the edge (e.g., as an illustrative example, a situation where a forklift moving between aisles that are close to the TRP). This determination by the UE may also be dependent on the current conditions (e.g., RSRP, LoS status, RSRQ, SNR, etc). For example, the UE may determine that a given feature has impact on the positioning measurement performance only if the RSRP of a signal is below a certain value.

In an embodiment, the UE may signal, to the network or gNB, the determined information on the optimal or preferred sets of configured power saving/reduced capability features the UE can implement while still achieving the positioning requirements. At 320, the gNB may then configure the appropriate features. In certain embodiments, the UE may use RRC, LPP, or MAC-CE to signal the information to the network. To indicate the need to pause some features, the UE may utilize new signaling to the gNB. Using RRM relaxation as an example the UE may request that for the next N measurements that it should not go into relaxed mode. In another embodiment, the UE may signal a time window where it should not use the power saving features (i.e., for T ms the UE should pause a given feature). In this case, the UE may also signal a starting time for the window or it may be implicitly assumed by gNB (e.g., T ms from the end of the slot the gNB receives the signal from the UE in). It may be possible, in some embodiments, that the UE would 'pause' for a shorter amount of time than the signaled value if the UE has completed PRS processing/measurement early. This can be fully up to UE implementation. In another example embodiment, the UE may signal a future PRS occasion and a given feature should be turned off until that PRS occasion is complete. In another example embodiment, the UE may signal that a given feature should be paused until the UE sends another message to resume the use of that feature. The UE may then perform positioning measurements as part of positioning session.

Figure 4:
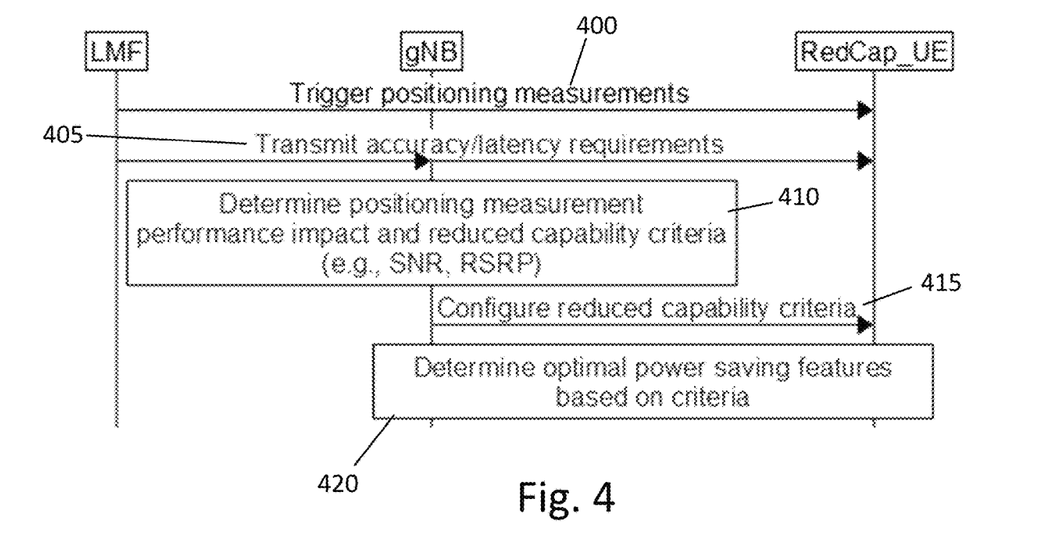
FIG. 4 illustrates a signaling diagram, according to an example embodiment.

FIG. 4 illustrates an example signaling flow diagram according to a gNB-centric embodiment. In an embodiment, a RedCap UE may be configured with a set of features that can enable power saving at the UE (e.g., RRM measurement relaxation, relaxed beam measurements, etc.). As illustrated in the example of FIG. 4, at 400, a location server (LMF) may trigger positioning measurements at the RedCap UE. In an embodiment, the UE may report, to the gNB, its positioning capabilities (e.g., PRS processing capability) that may affect positioning performance. As part of a positioning configuration, at 405, the LMF and/or UE may inform the gNB of the required accuracy and latency of the positioning session. In one embodiment, the LMF may directly inform the gNB of the requirements and the UE ID of the UE that is performing positioning. In another embodiment, the LMF may inform the UE of the requirements and then the UE may send this information to the gNB. In an additional embodiment, the LMF may also indicate some required integrity to the UE (i.e., level of trust/confidence in the positioning estimation).

As further illustrated in the example of FIG. 4, at 410, the gNB may determine the positioning measurement performance impact and reduced capability criteria (e.g., SNR, RSRP, etc.). For example, the gNB may estimate the impact of various power saving/reduced complexity features on the positioning performance (e.g., at least latency and accuracy) for different channel conditions that may be experienced by UEs. The gNB may then determine criteria for reduced capability or power saving features to be turned on/off by the UE (e.g., do not perform RRM relaxation). The criteria set by the gNB may include one or more of SNR, RSRP, RSRQ, LoS status, beam sweeping time, etc. These conditions may be threshold values signaled by the gNB. The gNB can also take into account the positioning capabilities of the UE (e.g., PRS processing capability) when determining the criteria. As shown at 415, the gNB may configure the UE with the reduced capability criteria. The UE may receive the criteria and, at 420, evaluate them based on the current channel conditions to determine the optimal power saving features based on the criteria, and can activate or deactivate (e.g., turn on/off) the appropriate reduced capability features. As one example, the UE may receive RSRP thresholds for RRM relaxation, measure the RSRP and then turn on the RRM relaxation based on the RSRP being above the threshold. The UE may then perform positioning measurements as part of positioning session.

One example of using recent history may include utilizing the latency incurred. In this case, the UE knows the time it took for recent PRS measurements and, based on this, may determine that measurements are taking too long when it performs certain reduced complexity features. In the UE-centric embodiment, the UE may then decide not to turn on certain reduced complexity features in order to decrease the latency of subsequent positioning measurements and/or reports. In the gNB-centric embodiment, the gNB may change the threshold values in order to inform UEs that they should be more critical when turning on certain features.

As another example, recent history for accuracy evaluation can also be used. For instance, relaxed measurements may mean that the sampling rate of measurements is reduced. In this case, the UE may skip critical measurement samples inducing inaccuracy in measurements that will reduce positioning accuracy below target. Therefore, if UE measurement variance is high in recent history, it may be determined that skipping measurements may not be a good idea and measurement relaxation should be avoided. The UE or gNB can take the appropriate action based on this information in either of the UE or gNB centric embodiments, respectively.

Figure 5:
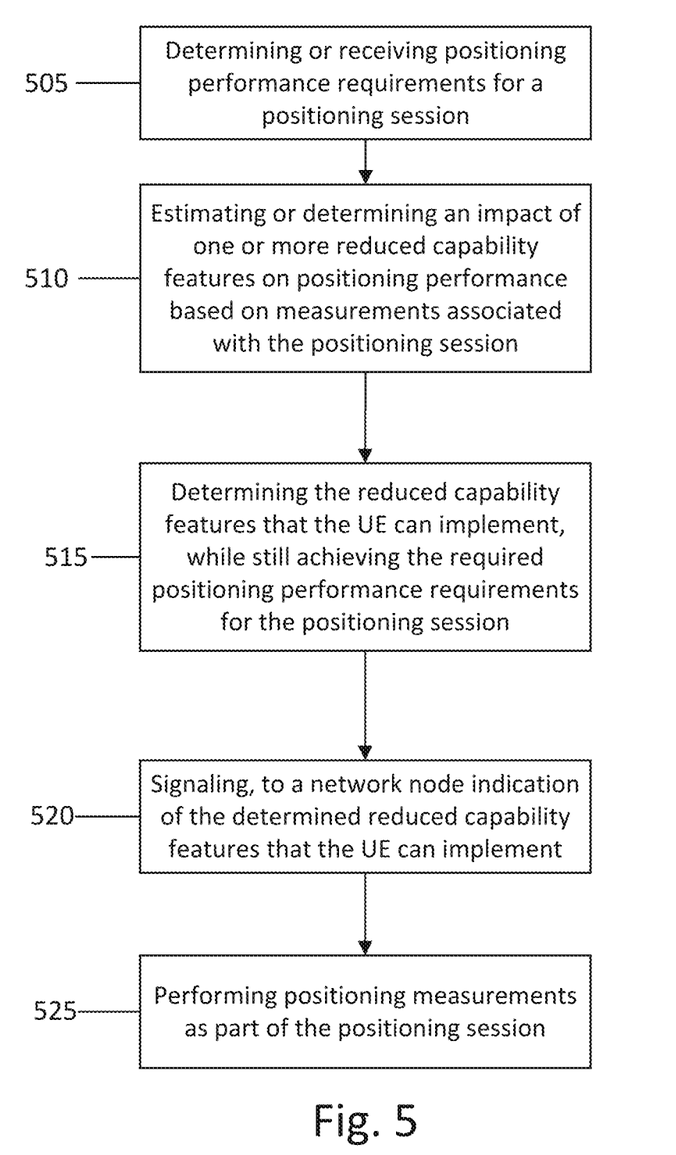
FIG. 5 illustrates an example flow diagram of a method, according to an embodiment.

FIG. 5 illustrates an example flow diagram of a method of positioning support, according to one example embodiment. In certain example embodiments, the flow diagram of FIG. 5 may be performed by a communication device in a communications system, such as LTE or 5G NR. For instance, in some example embodiments, the communication device performing the method of FIG. 5 may include a UE, sidelink (SL) UE, wireless device, mobile station, IoT device, UE type of roadside unit (RSU), other mobile or stationary device, or the like. In some embodiments, the example of FIG. 5 may illustrate example operations of a UE corresponding to apparatus 30 as illustrated in, and described with respect to, FIG. 7C. According to an embodiment, the UE performing the method of FIG. 5 may be a RedCap UE configured with one or more features that enable power saving at the UE, such as RRM measurement relaxation, relaxed beam measurements, etc. For instance, the RedCap UE may receive configuration on at least one reduced capability feature to be implemented by the RedCap UE.

As illustrated in the example of FIG. 5, the method may include, at 505, determining or receiving positioning performance requirements for a positioning session. For example, the determining 505 may include receiving, from a location server (e.g., LMF), positioning performance requirements, such as accuracy and latency requirements, for a positioning session. According to a further embodiment, the positioning performance requirements may be predefined (e.g., E911 requirements) such that they are already known at the UE. In an embodiment, the receiving 505 may include receiving, from the location server, an indication of a required integrity level for the positioning session, such as a level of trust or confidence in the positioning estimation. In certain embodiments, the method may further include, at 510, estimating or determining an impact, e.g., with respect to accuracy and latency, of one or more reduced capability features on positioning performance based at least on measurements associated with the positioning session. In an embodiment, the reduced capability features may include one or more power saving features. For example, the estimating 510 may include determining the impact by considering the UE's own positioning capabilities, such as its PRS processing capability. Additionally or alternatively, the estimating 510 may include determining the impact by considering the current channel conditions and/or how quickly the channel conditions are changing. For example, the UE may be relatively stationary and know that the Rx beam it is using for a particular RS has remained constant over a long period of time and, therefore, the need for recent RS measurements may not be as relevant. However, if the UE starts to move then the RS measurements may again become relevant.

As further illustrated in the example of FIG. 5, the method may include, at 515, based on the positioning performance requirements and the estimated impact, determining a subset of the one or more reduced capability features that the UE can implement or is capable of implementing, while still achieving the required positioning performance requirements for the positioning session. In an embodiment, the determining 515 may include determining to turn on, turn off, pause, activate or deactivate one or more of the reduced capability features at the UE. As an example, the determining 515 may include determining a need to cancel or pause the RRM relaxation, and/or to cancel or pause any other power saving features. It is noted that the need to pause or cancel certain features, such as RRM, may also be applicable even when the UE is just moving within a cell. In certain embodiments, the determining 515 may include determining the subset of power saving or reduced capability features that the UE can implement based at least on current channel conditions, such as reference signal received power (RSRP), line of sight (LoS) status, reference signal received quality (RSRQ), and/or signal-to-nose ratio (SNR). As one example relating to RSRP, the determining 515 may include determining that a given power saving feature has impact on the positioning measurement performance if the RSRP of a signal is below a certain value or threshold.

According to certain embodiments, the method may include, at 520, signaling, to a network node (e.g., gNB), information on or indication of the determined subset of reduced capability features and/or configurations that the UE can implement while still achieving the required accuracy and latency requirements for the positioning session. For example, the signaling 520 may include signaling the information using RRC, LPP, or MAC CE. In one embodiment, the signaling 520 may include signaling that, for the next N measurements, the UE should not enter into a relaxed mode of measurement. Additionally or alternatively, in an embodiment, the signaling 520 may include signaling a time window during which the UE should not use the power saving features. Additionally or alternatively, in an embodiment, the signaling 520 may include signaling a future PRS occasion and that a given power saving feature should be turned off until the PRS occasion is complete. Additionally or alternatively, in an embodiment, the signaling 520 may include signaling that a given power saving feature should be paused until the UE sends another message to resume the use of the given power saving feature. According to an embodiment, the method may further include, at 525, performing positioning measurements as part of the positioning session.

It is noted that FIG. 5 is provided as one example embodiment of a method or process. However, certain embodiments are not limited to this example, and further examples are possible as discussed elsewhere herein.

Figure 6:
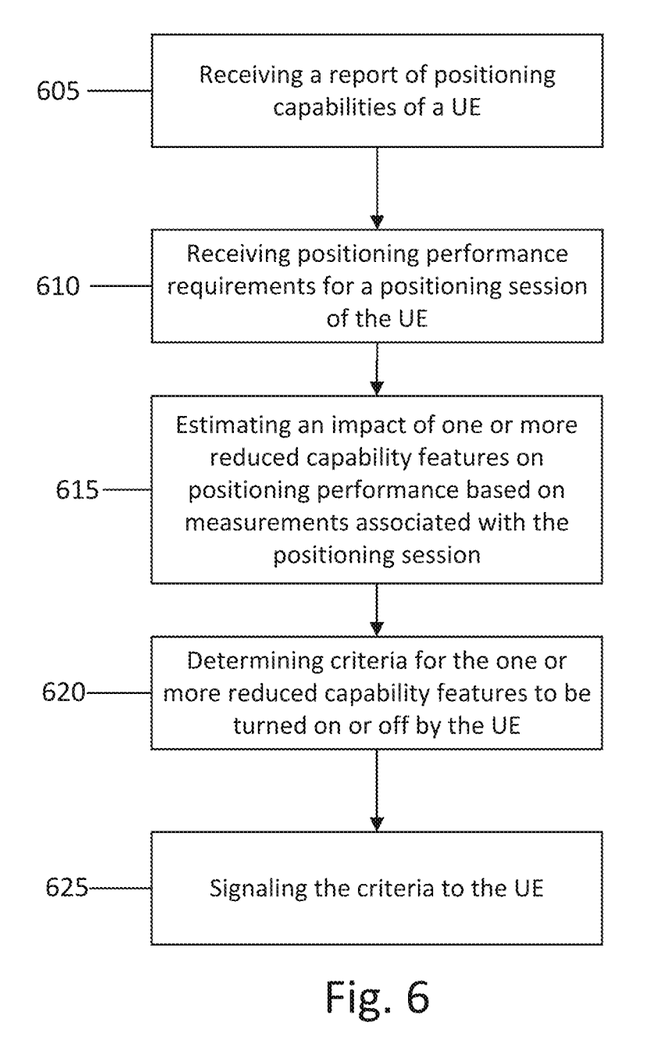
FIG. 6 illustrates an example flow diagram of a method, according to an embodiment.

FIG. 6 illustrates an example flow diagram of positioning support, according to one embodiment. In certain example embodiments, the flow diagram of FIG. 6 may be performed by a network entity or network node in a communications system, such as LTE or 5G NR. In some example embodiments, the network entity performing the method of FIG. 6 may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 6 may include a gNB or TRP, such as those illustrated in the examples of FIGS. 1-4, or any other entity discussed herein.

As illustrated in the example of FIG. 6, the method may include, at 605, receiving, from a UE, a report of positioning capabilities of the UE, such as PRS processing capability, which may affect positioning performance at the UE. The UE may be configured with one or more features that enable power saving at the UE (e.g., RRM measurement relaxation, relaxed beam measurements, etc.). In an embodiment, the method may include, at 610, receiving positioning performance requirements, such as accuracy and/or latency requirements, for a positioning session of the UE. According to one embodiment, the receiving 610 may include receiving the positioning performance requirements (e.g., accuracy and/or latency requirements) from the UE. In another embodiment, the receiving 610 may include receiving the positioning performance requirements from a location server (e.g., LMF), and optionally receiving an identifier (ID) of the UE performing the positioning measurements. According to a further embodiment, the receiving 610 may include receiving, from the location server, an indication of a required integrity level for the positioning session, e.g., a level of trust or confidence in the positioning estimation.

As further illustrated in the example of FIG. 6, the method may include, at 615, estimating an impact of one or more reduced capability features on positioning performance based on measurements associated with the positioning session. In an embodiment, the reduced capability features may include one or more power saving features. For instance, the estimating 615 may include estimating the impact of the reduced capability features on accuracy and latency performance for different channel conditions that may be experienced by the UE.

In certain embodiments, based on the positioning performance requirements and the estimated impact, the method may include, at 620, determining criteria for the one or more reduced capability features to be turned on or off, or activated or deactivated, by the UE. According to an embodiment, the determining 620 may include considering at least the positioning capabilities of the UE in determining the criteria. In some embodiments, the criteria may relate to one or more channel conditions, such as SNR, RSRP, RSRQ, LoS status, beam sweeping time, etc. According to an embodiment, the criteria may include one or more threshold values for at least one of the SNR, RSRP, RSRQ, LoS status, beam sweeping time, etc. According to certain embodiments, the method may include, at 625, signaling the criteria to the UE, which may then evaluate them based on the current channel conditions and turn on/off, or activated or deactivate, the appropriate reduced capability features. As one example, the UE could receive RSRP thresholds for RRM relaxation, measure the RSRP and then turn on the RRM relaxation based on the RSRP being above the threshold.

It is noted that FIG. 6 is provided as one example embodiment of a method or process. However, certain embodiments are not limited to this example, and further examples are possible as discussed elsewhere herein.

Figure 7A:
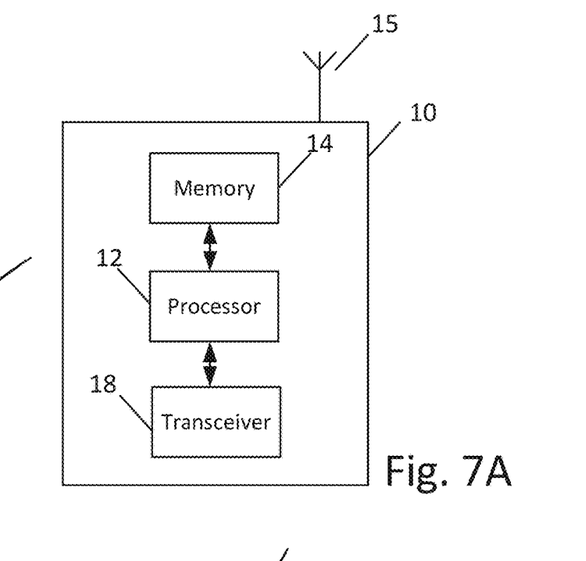
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent serving gNB or TRP or a neighboring gNB or TRP, such as those illustrated in FIGS. 1-4.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 7A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a NF, AF, SMF, or other 5GC node. For example, in some embodiments, apparatus 10 may be configured to perform one or more of the processes depicted in any of the flow charts or signaling diagrams described herein, such as those illustrated in any of FIGS. 1-6. In some embodiments, as discussed herein, apparatus 10 may be configured to perform a procedure relating to UL positioning, for example.

Figure 7B:
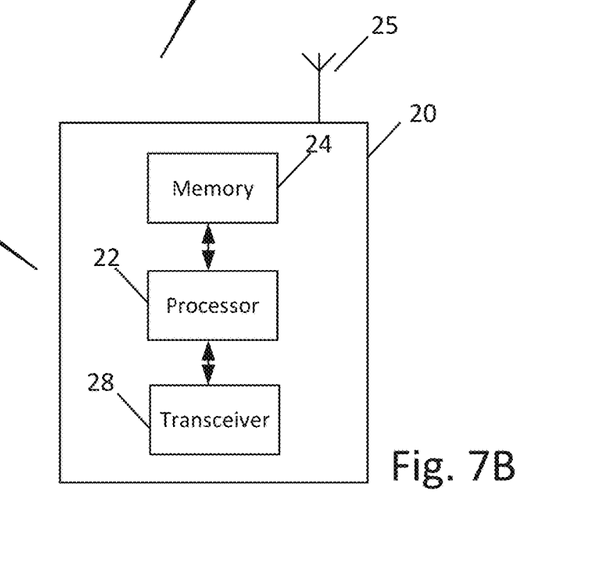
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 20 may represent a location management entity, such as the LMF illustrated in FIGS. 1-4.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 7B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a location management entity, such as a LMF, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-6. Thus, according to an embodiment, apparatus 20 may be configured to perform a procedure relating to UL positioning, as discussed elsewhere herein, for instance.

Figure 7C:
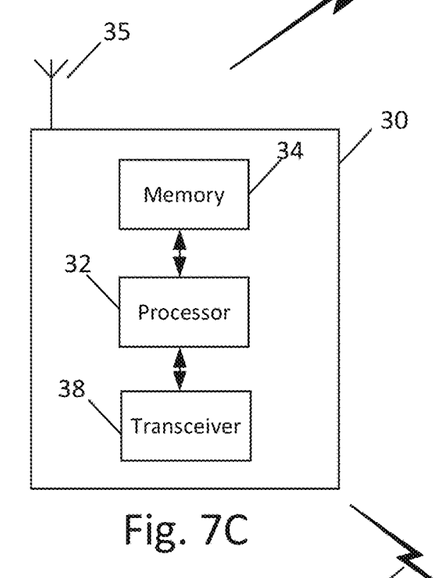
FIG. 7C illustrates an example block diagram of an apparatus, according to an embodiment.

FIG. 7C illustrates an example of an apparatus 30 according to another example embodiment. In an example embodiment, apparatus 30 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 30 may be implemented in, for instance, a wireless handheld device, a wireless plug-in accessory, or the like. It should be noted that one of ordinary skill in the art would understand that apparatus 30 may include components or features not shown in FIG. 7C.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 7C.

As illustrated in the example of FIG. 7C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 7C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, communication node, mobile equipment (ME), mobile station, mobile device, stationary device, IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 1-6. According to certain example embodiments, apparatus 30 may be configured to perform a procedure relating to UL positioning, for instance.

In some embodiments, an apparatus (e.g., apparatus 10, apparatus 20, and/or apparatus 30) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain embodiments are configured to mitigate the impact of RedCap features on positioning performance. Some embodiments can lower power consumption and UE complexity for a target positioning accuracy. Additionally, certain embodiments can lower positioning latency, such as allowing a UE to pause RRM relaxation thereby avoiding the need for Rx sweeping. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to perform:
   determining positioning performance requirements comprising both accuracy and latency of positioning according to a location management function for a positioning session;
   estimating an impact of one or more reduced capability features on positioning performance based on at least measurements associated with the positioning session by considering how quickly the channel conditions are changing when determining the impact, wherein the one or more reduced capability features comprises operating in half-duplex mode;
   based on the positioning performance requirements and the estimated impact, determining a subset of the one or more reduced capability features that the apparatus can implement while still achieving the positioning performance requirements for the positioning session.

2. The apparatus of claim 1, wherein the at least one memory and computer program code are configured, with the at least one processor, to cause the apparatus at least to perform:
   receiving configuration, from the network node, on at least one of the one or more reduced capability features to be implemented by the apparatus.

3. The apparatus of claim 1, wherein the positioning performance requirements comprise at least one of accuracy requirements, integrity level requirements, or latency requirements.

4. The apparatus of claim 1, wherein the reduced capability features comprise power saving features.

5. The apparatus of claim 1, wherein, when estimating the impact of the reduced capability features on the positioning measurements, the at least one memory and computer program code configured, with the at least one processor, to cause the apparatus to at least one of:
consider the apparatus' own positioning capabilities when determining the impact; or
consider current channel conditions.

6. The apparatus of claim 1, wherein, when determining the subset of the one or more reduced capability features that the apparatus can implement while still achieving the required positioning performance requirements for the positioning session, the at least one memory and computer program code configured, with the at least one processor, to cause the apparatus at least to:
determine the subset of the one or more reduced capability features based on current channel conditions comprising at least one of reference signal received power (RSRP), line of sight (LoS) status, reference signal received quality (RSRQ), or signal-to-nose ratio (SNR).

7. The apparatus of claim 1, wherein, when determining the subset of the one or more reduced capability features that the apparatus can implement while still achieving the required positioning performance requirements for the positioning session, the at least one memory and computer program code configured, with the at least one processor, to cause the apparatus at least to:
determine to turn on, turn off, or pause at least one of the one or more reduced capability features at the apparatus.

8. The apparatus of claim 1, wherein the apparatus comprises a reduced capability user equipment.

9. The apparatus of claim 1, wherein the one or more reduced capability features comprise one or more operation of the apparatus.

10. The apparatus of claim 1, wherein the at least one memory and computer program code are configured, with the at least one processor, to cause the apparatus at least to perform:
signaling, to a network node, information on the subset of the one or more reduced capability features that the apparatus can implement while still achieving the positioning performance requirements for the positioning session.

11. The apparatus of claim 10, wherein, when signaling the information on the determined reduced capability features that the apparatus can implement, the at least one memory and computer program code configured, with the at least one processor, to cause the apparatus at least to:
signal the information using one of at least radio resource control (RRC), long term evolution positioning protocol (LPP), or medium access control (MAC) control element (CE).

12. The apparatus of claim 10, wherein, when signaling the information on the determined reduced capability features that the apparatus can implement, the at least one memory and computer program code configured, with the at least one processor, to cause the apparatus to one of at least:
signal that, for the next N measurements, the apparatus should not enter into a relaxed mode of measurement;
signal a time window during which the apparatus should not use the reduced capability features;
signal a future positioning reference signal (PRS) occasion and that a given reduced capability feature should be turned off until the positioning reference signal (PRS) occasion is complete; or
signal that a given reduced capability feature should be paused until the apparatus sends another message to resume the use of the given reduced capability feature.

13. A method, comprising:
determining, by a user equipment, positioning performance requirements comprising both accuracy and latency of positioning according to a location management function for a positioning session;
estimating, by the user equipment, an impact of one or more reduced capability features on positioning performance based on at least measurements associated with the positioning session by considering how quickly the channel conditions are changing when determining the impact, wherein the one or more reduced capability features comprises operating in half-duplex mode;
based on the positioning performance requirements and the estimated impact, determining, by the user equipment, a subset of the one or more reduced capability features that the user equipment can implement while still achieving the positioning performance requirements for the positioning session.

* * * * *